(12) United States Patent
Cho et al.

(10) Patent No.: US 12,211,977 B2
(45) Date of Patent: Jan. 28, 2025

(54) BATTERY MANAGEMENT SYSTEM AND BATTERY PACK

(71) Applicant: LG ENERGY SOLUTION, LTD., Seoul (KR)

(72) Inventors: Hyun Ki Cho, Daejeon (KR); Jae Dong Park, Daejeon (KR); Keun Wook Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 501 days.

(21) Appl. No.: 17/627,944

(22) PCT Filed: Jul. 23, 2020

(86) PCT No.: PCT/KR2020/009690
§ 371 (c)(1),
(2) Date: Jan. 18, 2022

(87) PCT Pub. No.: WO2021/025341
PCT Pub. Date: Feb. 11, 2021

(65) Prior Publication Data
US 2022/0294039 A1    Sep. 15, 2022

(30) Foreign Application Priority Data

Aug. 8, 2019 (KR) .................. 10-2019-0097000

(51) Int. Cl.
*H01M 10/48* (2006.01)
*H01M 10/42* (2006.01)

(52) U.S. Cl.
CPC ..... *H01M 10/482* (2013.01); *H01M 10/4207* (2013.01); *H01M 10/425* (2013.01); *H01M 2010/4278* (2013.01)

(58) Field of Classification Search
CPC ........... H01M 10/482; H01M 10/4207; H01M 10/425; H01M 2010/4278;
(Continued)

(56) References Cited

U.S. PATENT DOCUMENTS

| 2010/0055543 A1* | 3/2010 | Tae | ......................... H02J 7/005 429/50 |
| 2010/0161260 A1* | 6/2010 | Kao | ..................... H01M 10/486 324/427 |

(Continued)

FOREIGN PATENT DOCUMENTS

| CN | 10220905 A | 10/2011 |
| CN | 105226759 A | 1/2016 |

(Continued)

OTHER PUBLICATIONS

Chinese office action dated Nov. 22, 2024 for Application No. 202080052313.5 (Year: 2024).*

(Continued)

*Primary Examiner* — Jared Fureman
*Assistant Examiner* — Michael J Warmflash
(74) *Attorney, Agent, or Firm* — Birch, Stewart, Kolasch & Birch, LLP

(57) ABSTRACT

Disclosed is a battery management system and a battery pack and the battery management system includes: a pack voltage sampling unit for periodically sampling a pack voltage of a battery pack; a pack current sampling unit for sampling a pack current of the battery pack; and a control unit for, when the pack voltage sampling of the battery pack is completed, recording a time from a sampling start time of the pack voltage to a sampling completion time of the pack voltage as a first time, and transmitting a voltage sampling (Continued)

synchronization signal for measuring a cell voltage of a battery cell to a plurality of lower-level battery management systems.

12 Claims, 8 Drawing Sheets

(58) Field of Classification Search
CPC ........ H01M 2010/4271; H01M 50/204; H04Q 2209/40; H04Q 9/00; H04Q 2209/845; Y02E 60/10; H02J 7/0013; H02J 7/0048; G01R 31/3842; Y02T 10/70
See application file for complete search history.

(56) References Cited

U.S. PATENT DOCUMENTS

| | | | |
|---|---|---|---|
| 2010/0295382 A1* | 11/2010 | Tae | H01M 10/425 307/150 |
| 2011/0050237 A1* | 3/2011 | Sekizaki | G01R 31/396 324/434 |
| 2011/0204898 A1* | 8/2011 | Kim | G01R 31/3842 324/434 |
| 2013/0046495 A1* | 2/2013 | Sim | H01M 10/48 702/63 |
| 2014/0347013 A1* | 11/2014 | Kim | G01R 31/382 320/134 |
| 2015/0198672 A1* | 7/2015 | Tabatowski-Bush | H01M 10/482 324/433 |
| 2019/0067755 A1* | 2/2019 | Kim | H02J 7/0047 |
| 2019/0242949 A1* | 8/2019 | Lemkin | H01M 10/42 |
| 2023/0068623 A1 | 3/2023 | Kim et al. | |

FOREIGN PATENT DOCUMENTS

| | | |
|---|---|---|
| CN | 108215907 A | 6/2018 |
| CN | 207449641 U | 6/2018 |
| CN | 109997289 A | 7/2019 |
| EP | 2806525 A2 | 11/2014 |
| JP | 2000-270492 A | 9/2000 |
| JP | 2010-57348 A | 3/2010 |
| JP | 2010-146571 A | 7/2010 |
| JP | 2012-508376 A | 4/2012 |
| JP | 2012-154641 A | 8/2012 |
| JP | 5330203 B2 | 10/2013 |
| JP | 5468846 B2 | 4/2014 |
| JP | 2014-110728 A | 6/2014 |
| JP | 2018-148747 A | 9/2018 |
| JP | 2019-41566 A | 3/2019 |
| KR | 10-2007-0095612 A | 10/2007 |
| KR | 10-2010-0024708 A | 3/2010 |
| KR | 10-2010-0052417 A | 5/2010 |
| KR | 10-1100974 B1 | 12/2011 |
| KR | 10-2012-0131298 A | 12/2012 |
| KR | 10-2013-0020638 A | 2/2013 |
| KR | 10-2016-0077875 A | 7/2016 |
| KR | 10-2017-0072474 A | 6/2017 |
| WO | WO 2018/005631 A1 | 1/2018 |

OTHER PUBLICATIONS

Extended European Search Report for European Application No. 20850599.0, dated Aug. 31, 2022.
Roscher et al., "Synchronisation using Wireless Trigger-Broadcast for Impedance Spectroscopy of Battery Cells", IEEE Sensors Applications Symposium, 2015, (6 pages total) XP032788598.
International Search Report (PCT/ISA/210) issued in PCT/KR2020/009690, dated Nov. 16, 2020.

* cited by examiner

BATTERY MANAGEMENT SYSTEM AND BATTERY PACK

CROSS-REFERENCE TO RELATED APPLICATIONS

This application claims the benefit of Korean Patent Application No. 10-2019-0097000 filed on Aug. 8, 2019, in the Korean Intellectual Property Office, the disclosure of which is incorporated herein in its entirety by reference.

TECHNICAL FIELD

The present invention relates to a battery management system and a battery pack.

BACKGROUND ART

In order to accurately estimate the remaining capacity, life, and available power of a battery, in addition to accurately measuring the voltage and current of the battery cell unit, module unit, and pack unit, the measurement timing point of the corresponding voltage and current must be consistent.

However, for example, in the wireless communication-based system structure in which a plurality of battery management systems such as a lower-level battery management system (hereinafter referred to as 'BMS') (for example, a module BMS) and an upper-level battery management system (for example, a pack BMS) are provided, as an example, since the synchronization signal for voltage or current measurement cannot be collectively received from the higher-level controller (for example, a master BMS) outside the battery pack, when each BMS individually measures the cell voltage, pack voltage, and the like, the measurement timing point is not consistent, so that there was a problem in that it was not possible to accurately estimate the remaining capacity, life, and usable output of the battery.

DISCLOSURE OF THE INVENTION

Technical Problem

The present invention has been made to solve the above problems, and provides a battery management system and a battery pack capable of matching measurement timing point of voltage and current within a battery without a control signal from a host controller outside the battery.

Technical Solution

A battery management system according to an embodiment of the present invention includes: a pack voltage sampling unit configured to periodically sample a pack voltage of a battery pack; a pack current sampling unit configured to sample a pack current of the battery pack; and a control unit configured to, when the pack voltage sampling of the battery pack is completed, record a time from a sampling start time of the pack voltage to a sampling completion time of the pack voltage as a first time, and transmit a voltage sampling synchronization signal for measuring a cell voltage of a battery cell of the battery pack to a plurality of lower-level battery management systems. At this time, the control unit performs sampling synchronization on the sampled measurement signal between each lower-level battery management system based on a second time, which is a sampling time at which a cell voltage measurement received from each lower-level battery management system is performed, and the based on first time.

The battery management system according to an embodiment of the present invention may further include a communication unit including a transmission unit for wirelessly broadcasting the voltage sampling synchronization signal to the plurality of lower-level battery management systems and a reception unit for wirelessly receiving the second time from each lower-level battery management system and cell voltage sampling information for the second time.

For example, after the transmission unit transmits the measurement synchronization signal to the plurality of lower-level battery management systems and after the pack voltage sampling is completed, the pack current sampling unit may perform the pack current sampling.

The second time may be a difference between a time when each lower-level battery management system starts measuring a cell voltage and a time when the cell voltage measurement ends.

In addition, the control unit may delay a sampling start time point of the pack voltage by ½ of the second time, and locate a generation time point of the voltage sampling synchronization signal to be in the middle of the second time, so that the control unit performs the sampling synchronization by synchronizing the cell voltage sampling information received from the plurality of lower-level battery management systems and the measurement time of the sampling information of the pack voltage sampling unit.

For example, the control unit may transmit the cell voltage sampling information for performing the sampling synchronization to an upper-level controller.

In addition, a battery management system according to another embodiment of the present invention includes: a reception unit configured to receive a voltage sampling synchronization signal for measuring a cell voltage of a battery cell from a higher-level battery management system; a cell voltage sampling unit configured to sample a cell voltage of the battery cell when receiving the voltage sampling synchronization signal; a control unit configured to calculate a second time, which is a time from a time point at which the cell voltage sampling is started to a time point at which the cell voltage sampling is completed; and a transmission unit configured to transmit the calculated second time and cell voltage sampling information during the second time to the higher-level battery management system.

Moreover, a battery pack according to another embodiment of the present invention includes a plurality of lower-level battery management systems and at least one higher-level battery management system, wherein the at least one higher-level battery management system includes: a pack voltage sampling unit configured to periodically sample a pack voltage of the battery pack; a pack current sampling unit configured to sample a pack current of the battery pack; and a first control unit configured to, after starting to sample the pack voltage of the battery pack, when the pack voltage sampling of the battery pack is completed, record a time from a sampling start time of the pack voltage to a sampling completion time of the pack voltage as a first time, and transmit a voltage sampling synchronization signal for measuring a cell voltage of a battery cell of the battery pack to the plurality of lower-level battery management systems, wherein each lower-level battery management system includes: a cell voltage sampling unit configured to sample a cell voltage of the battery cell when receiving a voltage sampling synchronization signal for measuring a cell voltage of a battery cell from the higher-level battery management system; and a second control unit configured to calculate a second time, which is a time from a time point at which the cell voltage sampling is started to a time point at which the cell voltage sampling is completed, and transmits the calculated second time and cell voltage sampling information during the second time to the higher-level battery management system, wherein the first control unit performs sampling synchronization on the sampled measurement signal between each lower-level battery management system based on the second time received from each lower-level battery management system and based on the first time.

For example, wireless communication is performed between the higher-level battery management system and each lower-level battery management system.

The control unit may delay a sampling start time point of the pack voltage by ½ of the second time, and locate a generation time point of the voltage sampling synchronization signal to be in the middle of the second time, so that the control unit performs the sampling synchronization by synchronizing the cell voltage sampling information received from the plurality of lower-level battery management systems and the measurement time of the sampling information of the pack voltage sampling unit.

The pack current sampling unit may perform the pack current sampling after the pack voltage sampling is completed and a measurement synchronization signal is transmitted to the plurality of lower-level battery management systems.

In addition, the first control unit may transmit the cell voltage sampling information for performing the sampling synchronization to an upper-level controller.

Effects of the Invention

According to the present invention, it is possible to match the measurement timing point such as voltage and current in the battery without a control signal from a host controller outside the battery, so that the remaining capacity, life, and available output of the battery can be more accurately estimated.

Other effects according to the present invention will be described further according to the following examples.

BRIEF DESCRIPTION OF THE DRAWINGS

FIG. 5A is a timing chart before synchronization, and FIG. 5B is a timing chart after synchronization.

MODE FOR CARRYING OUT THE INVENTION

Figure 1:
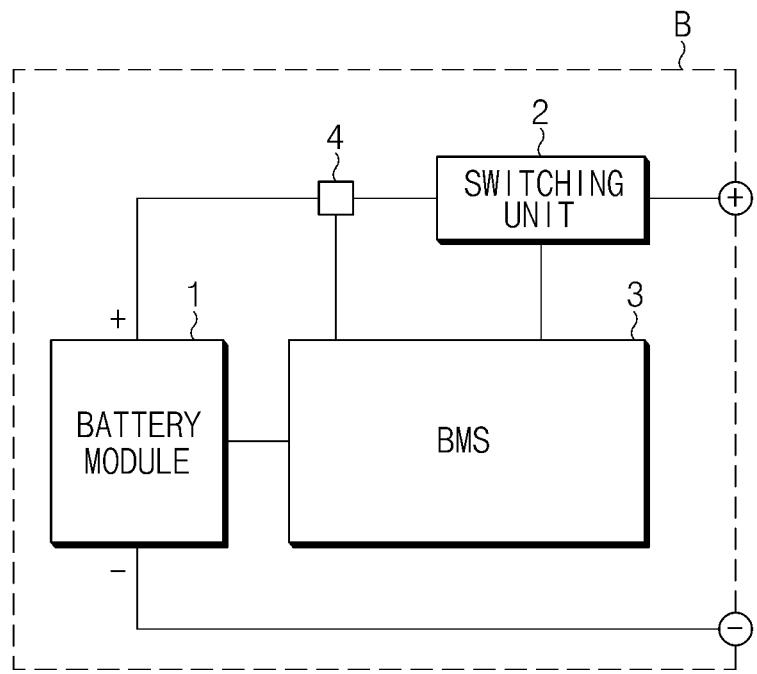
FIG. 1 is a block diagram schematically showing the configuration of a general battery pack according to an embodiment of the present invention.

Hereinafter, various embodiments of the present invention will be described with reference to the accompanying drawings. However, this is not intended to limit the present invention to a specific embodiment, it should be understood to include various modifications, equivalents, and/or alternatives of the embodiments of the present invention. In relation to the description of the drawings, like reference numerals may be used for like elements.

Terms used in this document are only used to describe a specific embodiment, and may not be intended to limit the scope of other embodiments. The terms of a singular form may include plural forms unless otherwise specified. All terms used herein, including technical or scientific terms, may have the same meaning as commonly understood by a person of ordinary skill in the art. Terms defined in a commonly used dictionary may be interpreted as having the same or similar meaning as the meaning in the context of the related technology, and are not interpreted as ideal or excessively formal meanings unless explicitly defined in this document. In some cases, even terms defined in this document cannot be interpreted to exclude embodiments of the present invention.

In addition, in describing the constituent elements of the embodiment of the present invention, terms such as first, second, A, B, (a), and (b) may be used. These terms are only for distinguishing the component from other components, and the nature, order, or sequence of the component is not limited by the terms. If a component is described as being "connected", "coupled" or "jointed" to another component, the component may be directly connected or accessed to the other component, but it will be understood that another component may be "connected", "coupled" or "jointed" between each component.

Referring to FIG. 1, a basic configuration of a battery pack will be described. FIG. 1 is a block diagram schematically showing the configuration of a general battery pack according to an embodiment of the present invention.

As shown in FIG. 1, the battery pack B includes at least one battery module 1 consisting of one or more battery cells and capable of charging and discharging, a switching unit 2 connected in series to the + terminal side or the − terminal side of the battery module 1 to control the charge/discharge current flow of the battery module 1, and a battery management system 3 for controlling and managing the voltage, current, temperature, and the like of the battery pack B to prevent overcharging and overdischarging.

Here, the switching unit 2 is a mechanical switching element or semiconductor switching element for controlling the current flow of the battery module 1 for charging or discharging of the battery module 1, and for example, at least one mechanical relay or MOSFET may be used.

In addition, in order to monitor the voltage, current, temperature, and the like of the battery pack B, the BMS 3 is connected to the battery module 1 and can receive data on voltage, current, temperature, and the like. Further, for example, when the switching unit 2 is a semiconductor switching element, it is possible to measure or calculate the voltage and current of the gate, source and drain of a semiconductor switching device, and in addition, current, voltage, temperature, and the like of the battery module 1 can also be measured using various sensors 4 provided adjacent to the semiconductor switching element. The data such as current, voltage, and temperature obtained as described above can be used to estimate the remaining capacity, life, and available output of the battery. The BMS 3 is an interface for receiving values obtained by measuring the above-described various parameters, and may include a plurality of terminals and a circuit connected to these terminals to process input values.

In addition, the BMS 3 may control ON/OFF of the switching unit 2 and may be connected to the battery module 1 to monitor the state of the battery module 1.

The battery pack B of FIG. 1 is provided as a unit of one battery module depending on the application, and the like, and a plurality of battery packs B may be connected in series or in parallel to form one battery pack (or battery rack). In this case, for example, the battery pack may include a plurality of lower-level battery management systems (e.g., module BMSs) provided in each battery module unit, and at least one upper-level battery management system (e.g., pack BMS) for managing the plurality of lower-end battery management systems.

Here, the lower-level battery management system provided in each battery module unit may control charging and discharging of the corresponding battery module by measuring a cell voltage or a module voltage in the corresponding battery module, and in addition, may transmit the measured cell voltage or module voltage to the higher-level battery management system, and may also receive control commands necessary for charging and discharging from the higher-level battery management system.

Similarly, a higher-level battery management system for managing a plurality of lower-level battery management systems may measure the total pack voltage or pack current, and the like, in which a plurality of battery modules are connected in series and parallel, and in addition, may receives cell voltage or module voltage from each lower-level battery management system, and may control charging and discharging of the battery pack, and may transmit a control command required for charging and discharging to each lower-level battery management system.

In this case, data can be transmitted and received between the battery management systems through wireless communication. In this case, it is required to synchronize the measurement signal from the lower-level battery management system and the measurement signal from the higher-level battery management system.

Figure 2:
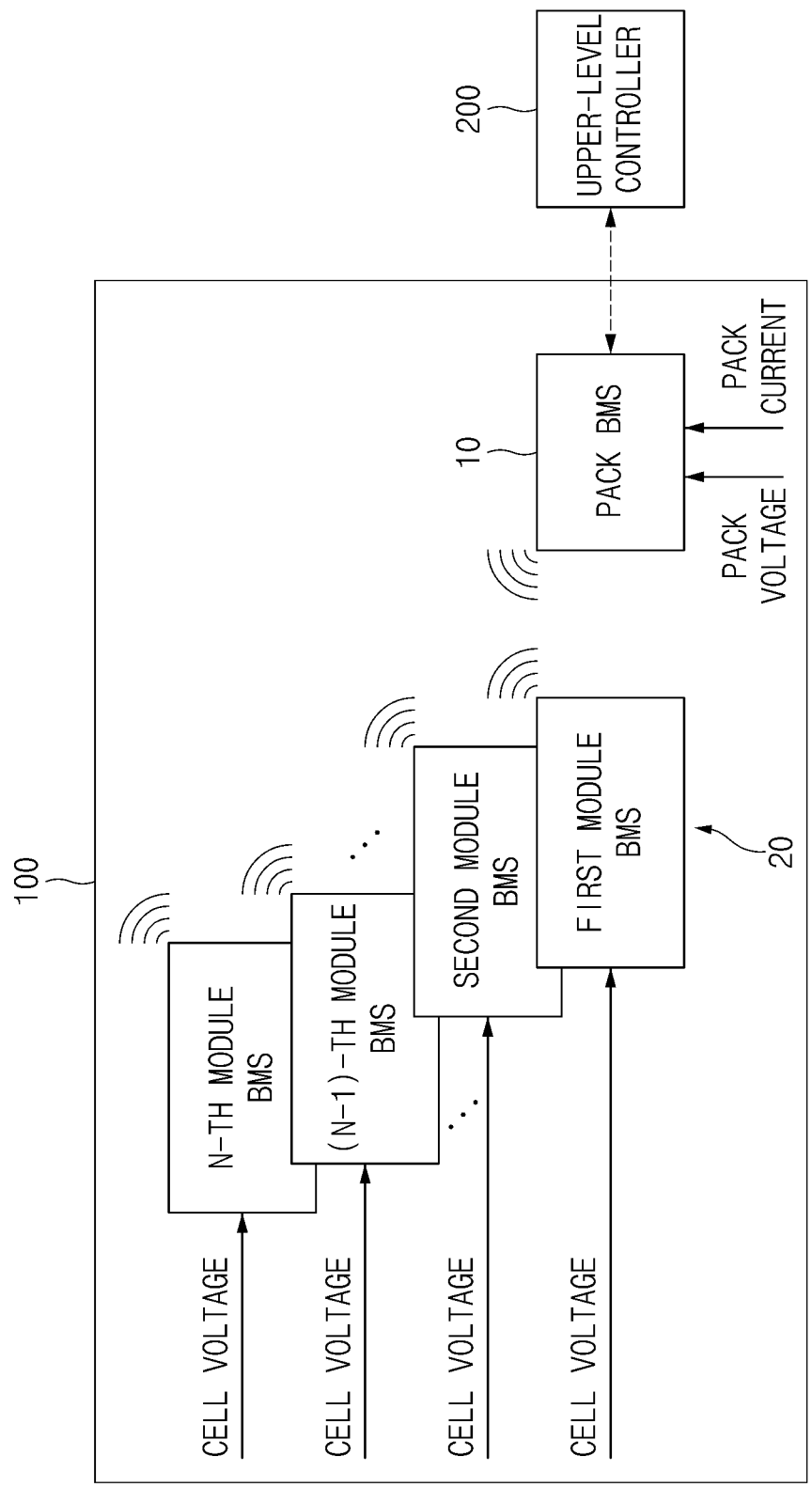
FIG. 2 is a block diagram schematically showing the configuration of a battery pack based on wireless communication according to an embodiment of the present invention.

Next, a method of synchronizing measurement signals between battery management systems according to an embodiment of the present invention will be described with reference to FIGS. 2 to 4. FIG. 2 is a block diagram schematically showing the configuration of a wireless communication-based battery pack according to an embodiment of the present invention, FIG. 3 is a block diagram schematically showing the configuration of the pack BMS of FIG. 2, and FIG. 4 is a block diagram schematically showing the configuration of the module BMS of FIG. 2.

As shown in FIG. 2, the battery pack 100 according to an embodiment of the present invention includes at least one pack BMS 10 and a plurality of module BMSs 20.

Figure 3:
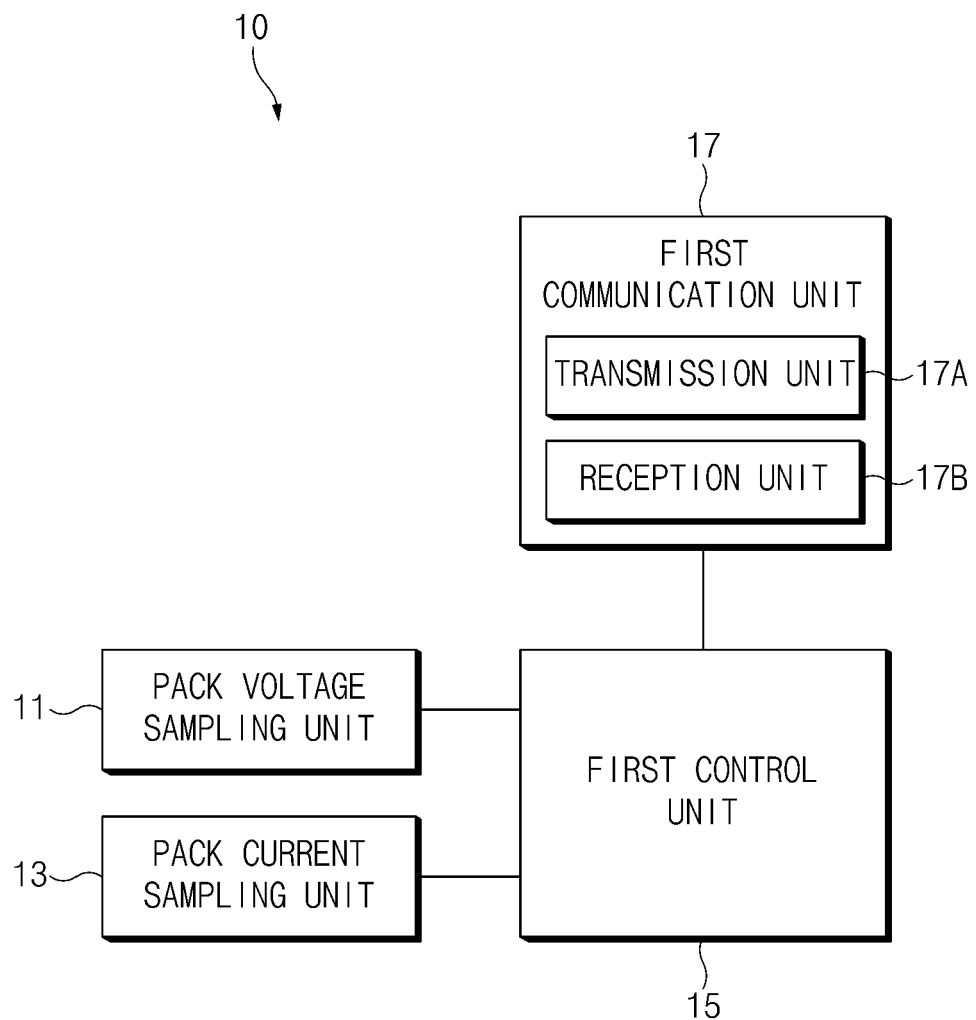
FIG. 3 is a block diagram schematically showing the configuration of the pack BMS of FIG. 2.
Figure 4:
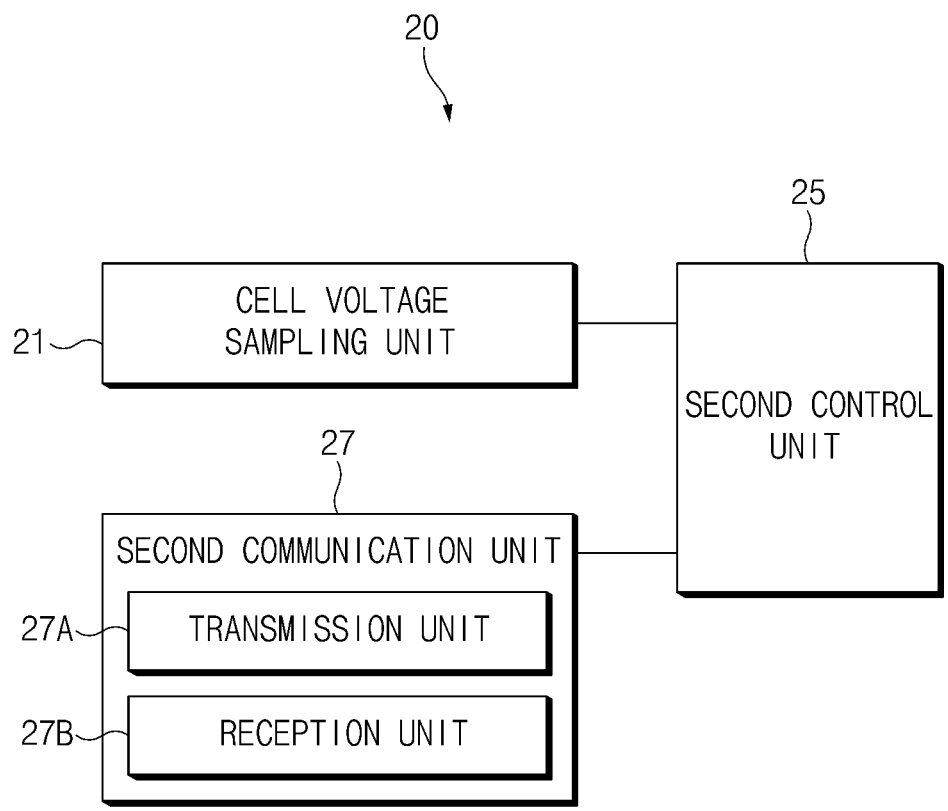
FIG. 4 is a block diagram schematically showing the configuration of the module BMS of FIG. 2.

First, the pack BMS 10, as a higher-level battery management system, may include a pack voltage sampling unit 11, a pack current sampling unit 13, and a first control unit 15 as shown in FIG. 3.

The pack voltage sampling unit 11 periodically samples the pack voltage of the battery pack. For example, a pack voltage signal measured from a terminal for measuring the pack voltage is periodically sampled.

The pack current sampling unit 13 samples the pack current of the battery pack. For example, a pack current signal measured from a sensor for measuring the pack current is sampled. For example, the pack current sampling unit 13 may perform pack current sampling after the pack voltage sampling is completed and the measurement synchronization signal is transmitted to the plurality of modules BMSs 20.

After starting to sample the pack voltage of the battery pack, when sampling the pack voltage of the battery pack is completed, the first control unit 15 records the time from the sampling start time of the pack voltage to the sampling completion time of the pack voltage as a first time, and controls to transmit a voltage sampling synchronization signal for measuring the cell voltage of the battery cell to the plurality of modules BMSs 20.

In addition, the pack BMS 10 may further include a first communication unit 17 to communicate with the plurality of module BMSs 20.

The first communication unit 17 may include, for example, a transmission unit 17A for wirelessly broadcasting a voltage sampling synchronization signal or the like to the plurality of modules BMSs 20, and a reception unit 17B for wirelessly receiving a data signal or the like from each module BMS 20. For example, the reception unit 17B may receive a second time, which is a sampling time at which cell voltage measurement is performed and measurement signal data, which is the cell voltage sampling information during the second time, from each module BMS 20. For example, the second time may be a difference between a time when the module BMS 20 starts measuring the cell voltage in the module BMS 20 after receiving the measurement synchronization signal and a time when the cell voltage measurement is completed.

In addition, the pack BMS 10 may further include a memory for recording the first time, the second time, and the measurement signal data.

Meanwhile, each module BMS 20 is a lower-level battery management system, and may include a cell voltage sampling unit 21 and a second control unit 25 as shown in FIG. 4.

The cell voltage sampling unit 21 samples the cell voltage of the battery cell when receiving a voltage sampling synchronization signal for measuring the cell voltage of the battery cell from the pack BMS 10. In addition, when receiving a voltage sampling synchronization signal for measuring the cell voltage of the battery cell from the pack BMS 10, the cell voltage sampling unit 21 may further sample a module voltage of a battery module in which the corresponding battery cells are connected in series and/or in parallel.

The second control unit 25 calculates a second time, which is a time from when sampling is started to when sampling is completed, for a measurement signal such as a cell voltage, and controls to transmit the calculated second time and measurement sampling information for the second time to the pack BMS 10.

In addition, each module BMS 20 may further include a second communication unit 27 to communicate with the pack BMS 10.

The second communication unit 27, for example, may include a reception unit 27B for wirelessly receiving a voltage sampling synchronization signal for measuring the cell voltage of the battery cell from the pack BMS 10, and a transmission unit 27A for wirelessly transmitting measurement signal data for sampling information, such as a cell voltage for the second time and the second time, to the pack BMS 10. Accordingly, signals can be transmitted and received through wireless communication between the pack BMS 10 and the module BMS 20 or between different module BMSs 20.

Additionally, the module BMS 20 may further include a memory for recording the second time and measurement signal data.

Here, the first control unit 15 of the pack BMS 10 synchronizes a measurement signal such as a pack voltage measured by the pack BMS 10 and a measurement signal such as a cell voltage measured by the module BMS 20. Specifically, based on a second time that is a sampling time at which the cell voltage measurement received from each module BMS 20 is performed, and a first time related to the pack voltage sampling, sampling synchronization is performed on the measured signal sampled between each module BMS 20. For example, as the sampling start time point of the pack voltage is delayed by ½ of the second time, and the generation time point of the voltage sampling synchronization signal is located in the middle of the second time, the first control unit 15 may synchronize the cell voltage sampling information received from the plurality of modules BMSs 20 and the measurement time of the sampling information of the pack voltage sampling unit 11 to perform sampling synchronization.

Figure 5A:
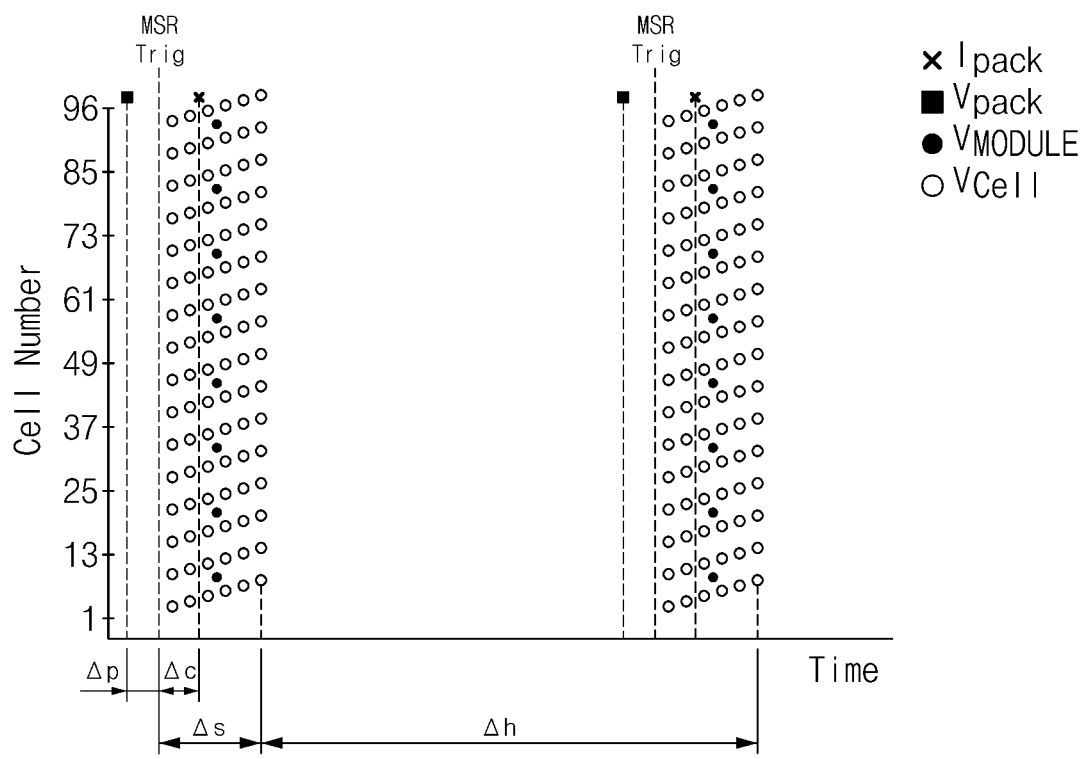
FIGS. 5A and 5B are timing charts for explaining a process of performing synchronization on a measurement signal.
Figure 5B:
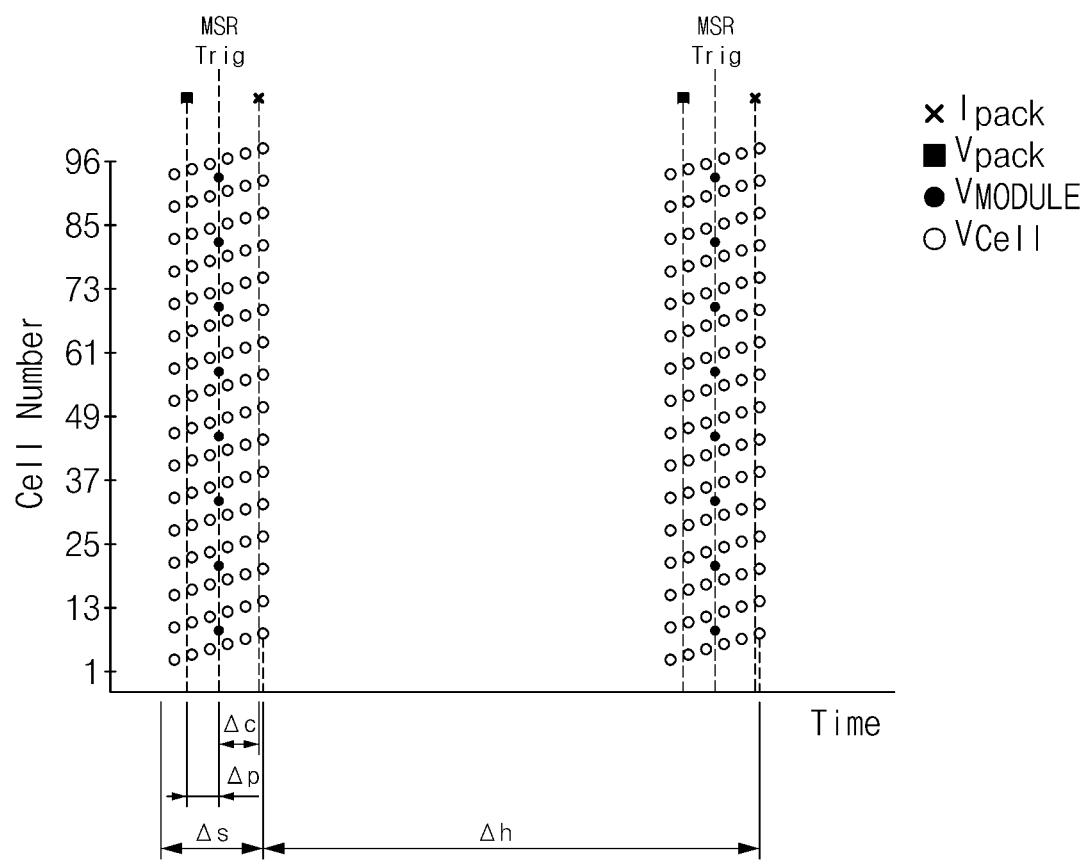

A process of performing synchronization on a measurement signal will be described in detail with reference to FIGS. 5A and 5B. FIGS. 5A and 5B are timing charts for explaining a process of performing synchronization on a measurement signal, and FIG. 5A is a timing chart before synchronization, and FIG. 5B is a timing chart after synchronization.

As shown in FIG. 5A, before synchronization is performed, the pack voltage sampling unit 11 of the pack BMS 10 first periodically samples the pack voltage VPACK during Δp (i.e., the pack voltage measurement time, the first time). Immediately after the sampling of the pack voltage is completed, the first control unit 15 generates a sampling synchronization signal MSR Trig. and transmits the sampling synchronization signal MSR Trig. to the module BMS 20, and in addition, the pack current sampling unit 13 samples the pack current IPACK during Δc (i.e., the pack current measurement time). On the other hand, based on the received sampling synchronization signal MSR Trig., the cell voltage sampling unit 21 of the module BMS 20 sequentially samples the cell voltage VCELL for each of cells 1 to 96 during Δs. However, in FIG. 5A, it is illustrated that the cells are sequentially sampled for Δs in units of 6, but is not limited thereto. Additionally, based on the received sampling synchronization signal MSR Trig., the cell voltage sampling unit 21 may further sample the module voltage VMODULE for a predetermined time (e.g., Δs/2). Here, the pack voltage VPACK and the pack current IPACK are data measured from the pack BMS 10, and the cell voltage VCELL and the module voltage VMODULE are data measured from the module BMS 20. In addition, the pack BMS 10 may measure and record Δp and Δc based on, for example, an internal clock signal by a clock generator provided therein, and likewise, the module BMS 20 may measure and record Δs based on, for example, an internal clock signal generated by a clock generator provided therein. Here, Δh denotes a cycle time for transmitting the cell voltage measurement signal from the module BMS 20 to the pack BMS 10.

Meanwhile, the first control unit 15 may perform sampling synchronization on the sampled measurement signals of the pack voltage VPACK, the pack current IPACK, the cell voltage VCELL, and the module voltage VMODULE. For example, as shown in FIG. 5B, as the sampling start time point of the pack voltage is delayed by ½ of the second time (i.e., by Δs/2) and the generation time point of the voltage sampling synchronization signal MSR Trig. is located in the middle of the second time, sampling synchronization can be performed by synchronizing the measurement time of the sampling information VCELL and VMODULE received from each module BMS 20 and the sampling information VPACK and IPACK measured by the pack BMS 10 itself.

In such a way, according to the present invention, it is possible to match the measurement timing point such as voltage and current in the battery without a control signal from a host controller outside the battery, so that the remaining capacity, life, and available output of the battery can be more accurately estimated.

Additionally, the first control unit 15 of the pack BMS 10 may transmit sampling result information obtained by performing sampling synchronization to the upper-level controller 200. For example, cell voltage sampling information may be transmitted to the upper-level controller 200. In addition, the first control unit 15 of the pack BMS 10 may transmit information on the state and control of the battery to the upper-level controller 200, or control the operation of the battery pack 100 based on a control signal applied from the upper-level controller 200. The first control unit 15 of the pack BMS 10 may exchange various signals and data with the upper-level controller 200 by wire and/or wirelessly. Here, the battery pack 100 may be, for example, a battery pack of an energy storage system (ESS), and the upper-level controller 200 may be, for example, a master BMS that integrates and manages the plurality of battery packs 100. However, the present invention is not limited thereto, and the battery pack 100 may be an automobile battery pack, and the upper-level controller 200 may be a microcontroller (MCU) of an automobile system.

Meanwhile, the present invention may be implemented as a higher-level battery management system such as the pack BMS 10, which is applied in the battery pack 100, and may be implemented as a lower-level battery management system such as the module BMS 20. However, since the higher-level battery management system and the lower-level battery management system are the same as described above, detailed descriptions will be omitted.

Figure 6:
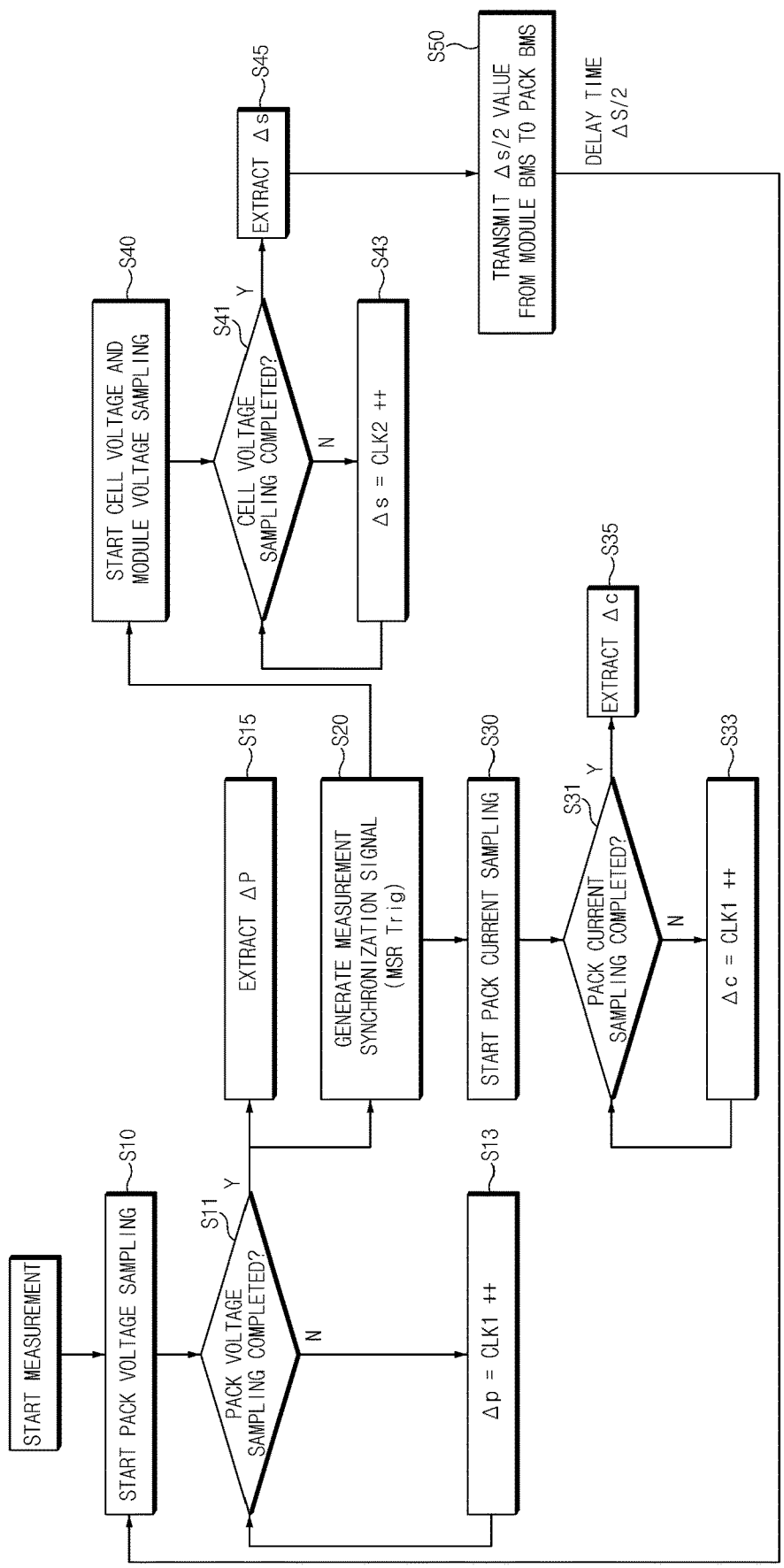
FIG. 6 is a flowchart illustrating a measurement synchronization method of a battery management system according to an embodiment of the present invention.

Next, a measurement synchronization method of the pack BMS 10 will be described with reference to FIG. 6. FIG. 6 is a flowchart illustrating a measurement synchronization method of a battery management system.

First, when the pack BMS 10 starts measuring, the pack voltage sampling unit 11 starts sampling the pack voltage (S10). Next, it is determined whether the sampling of the pack voltage has been completed under a predetermined condition (S11). For example, the predetermined condition may be a predetermined time or a predetermined number of sampling times. If it is determined that the sampling of the pack voltage has not been completed (N), the internal clock CLK1++ is added to Δp (i.e., the pack voltage measurement time, the first time) (S13), and the process returns to operation S11. If, in operation S11, when it is determined that the sampling of the pack voltage is complete (Y), the first control unit 15 extracts Δp (S15), generates a measurement synchronization signal MSR Trig. with this, and transmits the signal to the module BMS 20 (S20). First, when the pack BMS 10 starts measuring, the pack current sampling unit 13 starts sampling the pack current (S30). Next, it is determined whether the sampling of the pack current has been completed under a predetermined condition (S31). For example, the predetermined condition may be a predetermined time or a predetermined number of sampling times. If it is determined that sampling of the pack current has not been completed (N), the internal clock CLK1++ is added to Δc (i.e., the pack current measurement time) (S33), and the process returns to operation S31. If, in operation S31, when it is determined that sampling of the pack current is completed (Y), the first control unit 15 extracts Δc (S35).

On the other hand, after step S20, the cell voltage sampling unit 21 of the module BMS 20 starts sampling the cell voltage and/or the module voltage when the measurement synchronization signal MSR Trig. is received (S40). For example, the module voltage sampling time may be ½ of the cell voltage sampling time. Next, it is determined whether the cell voltage sampling has been completed under a predetermined condition (S41). For example, the predetermined condition may be a predetermined time or a predetermined number of sampling times. If it is determined that the cell voltage sampling has not been completed (N), an internal clock CLK2++ is added to Δs (i.e., the cell voltage measurement time in the module BMS 20, the second time) (S43), and the process returns to operation S41. If, in operation S41, when it is determined that the sampling of the cell voltage is completed (Y), As is extracted (S45). Subsequently, the module BMS 20 transmits the Δs/2 value to the pack BMS 10 (S50). Subsequently, the first control unit 15 of the pack BMS 10 delays the measurement time of the pack voltage and the pack current by Δs/2 based on the received Δs/2 value, and performs sampling synchronization between the sampling signal measured in the pack BMS 10 and the sampling signal measured in the module BMS 20, and returns to operation S10 again, so that the measurement synchronization process may be periodically repeated. Here, the module BMS 20 transmits the Δs/2 value to the pack BMS 10, but the module BMS 20 may transmit the Δs value, and the pack BMS 10 may delay the Δs/2 value.

Figure 7:
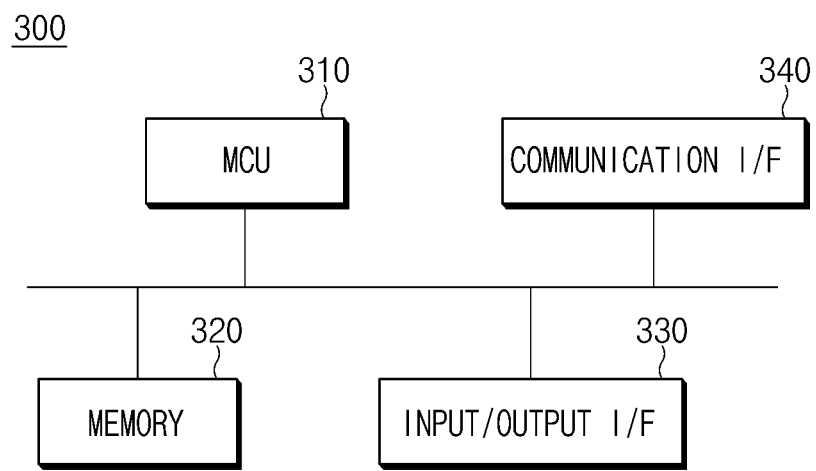
FIG. 7 is a block diagram showing a hardware configuration of a battery management system (BMS) according to an embodiment of the present invention.

Meanwhile, the lower-level or higher-level battery management system of the battery pack 100 of the present invention may be expressed in hardware as shown in FIG. 7. FIG. 7 is a block diagram showing the hardware configuration of the battery management system 300 according to an embodiment of the present invention.

As shown in FIG. 7, the battery management system 300 may include a microcontroller (MCU) 310 that controls various processes and configurations, a memory 320 in which an operating system program and various programs (e.g., a sampling synchronization program, a battery pack abnormality diagnosis program, or a battery pack temperature estimation program) are recorded, an input/output interface 330 that provides an input interface and an output interface between a battery module and/or a switching unit (e.g., a semiconductor switching device), and a communication interface 340 capable of communicating with an external (for example, upper-level controller) through a wired or wireless communication network. In this way, the computer program according to the present invention may be recorded in the memory 320 and processed by the microcontroller 310, and for example, may be implemented as a module that performs each functional block shown in FIGS. 2 to 4.

In such a way, according to the present invention, it is possible to match the measurement timing point such as voltage and current in the battery without a control signal from a host controller outside the battery, so that the remaining capacity, life, and available output of the battery can be more accurately estimated.

In the above, although the present invention has been described by the limited embodiments and drawings, the present invention is not limited thereto, and it is apparent that various implementations are possible within the equivalent range of the technical idea of the present invention and the claims to be described below by those of ordinary skill in the technical field to which the present invention belongs.

The invention claimed is:

1. A battery management system, comprising:
    a pack voltage sampling unit configured to periodically sample a pack voltage of a battery pack;
    a pack current sampling unit configured to sample a pack current of the battery pack; and
    a control unit configured to:
    when the pack voltage sampling of the battery pack is completed, record a time from a sampling start time of the pack voltage to a sampling completion time of the pack voltage as a first time, and transmit a voltage sampling synchronization signal for measuring a cell voltage of a battery cell of the battery pack to a plurality of lower-level battery management systems, and
    perform sampling synchronization on sampled measurement signals between each lower-level battery management system based on a second time, which is a sampling time at which a cell voltage measurement received from each lower-level battery management system is performed, and based on the first time.

2. The battery management system of claim 1, further comprising a communication unit including a transmission unit for wirelessly broadcasting the voltage sampling synchronization signal to the plurality of lower-level battery management systems and a reception unit for wirelessly receiving the second time from each lower-level battery management system and cell voltage sampling information for the second time.

3. The battery management system of claim 2, wherein after the transmission unit transmits the measurement synchronization signal to the plurality of lower-level battery management systems and after the pack voltage sampling is completed, the pack current sampling unit performs the pack current sampling.

4. The battery management system of claim 1, wherein the second time is a difference between a time when each lower-level battery management system starts measuring a cell voltage and a time when the cell voltage measurement ends.

5. The battery management system of claim 4, wherein the control unit delays a sampling start time point of the pack voltage by ½ of the second time, and locates a generation time point of the voltage sampling synchronization signal to be in the middle of the second time, so that the control unit performs the sampling synchronization by synchronizing the cell voltage sampling information received from the plurality of lower-level battery management systems and the measurement time of the sampling information of the pack voltage sampling unit.

6. The battery management system of claim 5, wherein the control unit transmits the cell voltage sampling information for performing the sampling synchronization to an upper-level controller.

7. A battery management system, comprising:
    a reception unit configured to receive a voltage sampling synchronization signal for measuring a cell voltage of a battery cell from a higher-level battery management system;
    a cell voltage sampling unit configured to sample a cell voltage of the battery cell when receiving the voltage sampling synchronization signal;
    a control unit configured to calculate a second time, which is a time from a time point at which the cell voltage sampling is started to a time point at which the cell voltage sampling is completed; and a transmission unit configured to transmit the calculated second time and cell voltage sampling information during the second time to the higher-level battery management system.

8. A battery pack comprising a plurality of lower-level battery management systems and at least one higher-level battery management system,
wherein the at least one higher-level battery management system comprises:
a pack voltage sampling unit configured to periodically sample a pack voltage of the battery pack;
a pack current sampling unit configured to sample a pack current of the battery pack; and
a first control unit configured to, after starting to sample the pack voltage of the battery pack, when the pack voltage sampling of the battery pack is completed, record a time from a sampling start time of the pack voltage to a sampling completion time of the pack voltage as a first time, and transmit a voltage sampling synchronization signal for measuring a cell voltage of a battery cell to the plurality of lower-level battery management systems,
wherein each lower-level battery management system comprises:
a cell voltage sampling unit configured to sample a cell voltage of a battery cell of the battery pack when receiving a voltage sampling synchronization signal for measuring a cell voltage of the battery cell from the higher-level battery management system; and
a second control unit configured to calculate a second time, which is a time from a time point at which the cell voltage sampling is started to a time point at which the cell voltage sampling is completed, and transmits the calculated second time and cell voltage sampling information during the second time to the higher-level battery management system,
wherein the first control unit performs sampling synchronization on the sampled measurement signal between each lower-level battery management system based on the second time received from each lower-level battery management system and based on the first time.

9. The battery pack of claim 8, wherein wireless communication is performed between the higher-level battery management system and each lower-level battery management system.

10. The battery pack of claim 8, wherein the control unit delays a sampling start time point of the pack voltage by ½ of the second time, and locates a generation time point of the voltage sampling synchronization signal to be in the middle of the second time, so that the control unit performs the sampling synchronization by synchronizing the cell voltage sampling information received from the plurality of lower-level battery management systems and the measurement time of the sampling information of the pack voltage sampling unit.

11. The battery pack of claim 8, wherein the pack current sampling unit performs the pack current sampling after the pack voltage sampling is completed and a measurement synchronization signal is transmitted to the plurality of lower-level battery management systems.

12. The battery pack of claim 8, wherein the first control unit transmits the cell voltage sampling information for performing the sampling synchronization to an upper-level controller.

\* \* \* \* \*